(12) United States Patent
Carter et al.

(10) Patent No.: US 9,521,203 B2
(45) Date of Patent: *Dec. 13, 2016

(54) COMMUNICATION SESSION PROCESSING (71) Applicant: METASWITCH NETWORKS LTD, Enfield (GB)

(72) Inventors: Oliver James Carter, Hertford (GB); Christopher Richard Gibbs, London (GB); Oliver Fairless Nicolson, Enfield (GB); Phillip James Springett, Oswestry (GB)

(73) Assignee: Metaswitch Networks Ltd., Enfield (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/850,761

(22) Filed: Sep. 10, 2015

(65) Prior Publication Data

US 2016/0072897 A1 Mar. 10, 2016

Related U.S. Application Data (63) Continuation of application No. 13/793,658, filed on Mar. 11, 2013, now Pat. No. 9,160,608, which is a (Continued)

(30) Foreign Application Priority Data

Jul. 11, 2011 (GB) .................................. 1111862.7

(51) Int. Cl.
*H04L 12/28* (2006.01)
*H04L 29/08* (2006.01)
(Continued)

(52) U.S. Cl.
CPC ........... *H04L 67/146* (2013.01); *H04L 9/0631* (2013.01); *H04L 29/08621* (2013.01);
(Continued)

(58) Field of Classification Search
CPC .......... H04L 45/44; H04L 49/15; H04L 45/02; H04L 45/22; H04L 45/28
(Continued)

(56) References Cited

U.S. PATENT DOCUMENTS 7,764,612 B2 * 7/2010 Manuja ............. H04L 29/06027
370/231
9,160,608 B2 * 10/2015 Carter ................. H04L 65/1043

FOREIGN PATENT DOCUMENTS

JP 2005204216 A 7/2005
WO 2006128488 A1 12/2006

* cited by examiner

*Primary Examiner* — Chi H Pham
*Assistant Examiner* — Alexander O Boakye
(74) *Attorney, Agent, or Firm* — EIP US LLP (57) ABSTRACT

Measures for use in processing communication sessions in a telecommunications network are provided. Each communication session has a signaling path spanning a plurality of devices including one or more intermediate network devices and at least two endpoint devices, the signaling path comprising a plurality of signaling segments, each segment being between two devices in the plurality of devices. A first signaling message, comprising a first identifier associated with the communication session, is received via a first signaling segment for a communication session. At least part of the first identifier is transformed using a deterministic encryption algorithm to generate a second identifier. A second signaling message, comprising the second identifier, is transmitted via a second signaling segment for the communication session to associate the second identifier with the communication session.

21 Claims, 3 Drawing Sheets

Related U.S. Application Data continuation of application No. 13/546,559, filed on Jul. 11, 2012, now abandoned.

(51) Int. Cl.
  *H04M 7/00* (2006.01)
  *H04L 9/06* (2006.01)
  *H04L 29/06* (2006.01)

(52) U.S. Cl.
  CPC ........ *H04L 65/104* (2013.01); *H04L 65/1006* (2013.01); *H04L 65/1043* (2013.01); *H04L 65/1053* (2013.01); *H04L 65/80* (2013.01); *H04M 7/006* (2013.01); *H04L 63/0428* (2013.01)

(58) Field of Classification Search
  USPC ............ 370/252, 231, 352, 229, 230.1, 236, 235,370/356, 412, 392, 493, 358, 389, 355, 398,370/401; 709/224, 223, 234, 235
  See application file for complete search history.

COMMUNICATION SESSION PROCESSING

CROSS-REFERENCE TO RELATED APPLICATIONS

This application is a Continuation of U.S. patent application Ser. No. 13/793,658, filed on Mar. 11, 2013, which is a continuation of U.S. patent application Ser. No. 13/546,559, filed on Jul. 11, 2012, which claims priority to foreign Patent Application No. GB 1111862.7, filed on Jul. 11, 2011. Each of the above-referenced patent applications is incorporated by reference in its entirety.

BACKGROUND OF THE INVENTION

1. Field of the Invention

The present disclosure relates to processing communication sessions in a telecommunications network.

2. Description of the Related Technology

Packet-based telecommunications networks typically include application gateway devices deployed at the boundaries between networks. For example, a Session Border Controller (SBC) is deployed at the border of a Voice Over Internet Protocol (VoIP) network and protects the network by policing communication sessions such as voice calls (or 'VoIP calls') flowing into or out of that network. Communication sessions such as voice calls are commonly set up using the Session Initiation Protocol (SIP). Such communication sessions have a signaling path spanning a plurality of devices including one or more intermediate network devices, such as SBCs and softswitches, and at least two endpoint devices, such as user terminals. The signaling path comprises a plurality of signaling segments, each segment being between two devices in the plurality of devices.

An SBC can employ network address translation (NAT) to hide the IP addresses of devices in one network from devices in another network, when communicating via a signaling segment. This typically involves the SBC replacing network addresses of signaling messages, and storing a network address lookup table for translating between the network addresses. In the case of SIP signaling messages, such network addresses can be Internet Protocol (IP addresses) contained in session or associated identifiers.

Various different references used in signaling messages refer to the correct communication session or associated identifiers. In the case of SIP signaling messages, there are many SIP extension functions, some of which, such as call transfer, may reference a session while it is still in existence, and others of which, such as voice quality reporting, may reference the communication session whilst it is still in existence and also after it has terminated. Such SIP extension functions are continually being developed.

There is therefore a need to provide improved methods for processing session identifiers in a signaling segment for a communications session.

SUMMARY

In accordance with embodiments, there is a method of processing communication sessions in a telecommunications network, each communication session having a signaling path spanning a plurality of devices including one or more intermediate network devices and at least two endpoint devices, the signaling path comprising a plurality of signaling segments, each segment being between two devices in the plurality of devices, the method comprising:

receiving, via a first signaling segment for a communication session, a first signaling message comprising a first identifier associated with the communication session;

transforming at least part of the first identifier using a deterministic encryption algorithm to generate a second identifier; and transmitting, via a second signaling segment for the communication session, a second signaling message comprising the second identifier to associate the second identifier with the communication session.

Hence, embodiments provide efficient network address hiding in session identifiers without the need to store network address translation lookup tables. Employing a deterministic, encrypted mapping allows devices with the necessary encryption/decryption keys to correctly transform the identifiers wherever they are referred to in subsequent signaling messages sent via the same signaling segment, regardless of whether the original communication session is still in progress.

In embodiments, the transformation is carried out by a device transmitting the second signaling message via the signaling segment. The device receiving the second signaling message via the signaling segment need not perform inverse translation of the received second identifier. In embodiments, the device receiving the second signaling message via the signaling segment does not perform inverse translation of the received second identifier, nor indeed of any other identifiers relating to the same session. Since the transformation is deterministic, and the same value is used for the transformation, the same identifier is received by the receiving device. Hence, the transformation may be performed independently of knowledge, at the receiving end, of the transformation having been applied. Hence, these devices may be standardised devices which interoperate according to predetermined standards, such as the SIP standard. Hence, in embodiments in which the transformation is applied in a particular device, for example in an SBC, standardized receiving devices may be used, for example standardized softswitches and standardized user terminals implementing standard protocols. Moreover, encryption keys need not be exchanged between the devices for the purpose of network address hiding as the receiving device need not perform decryption of session or associated identifiers.

In embodiments, the first signaling message comprises a first communication session setup signaling message for the communication session and the second signaling message comprises a second communication session setup signaling message for the communication session. Hence, embodiments provide efficient network address hiding during the communication session setup phase.

In embodiments, the method comprises receiving a third signaling message comprising the first identifier, transforming at least part of the first identifier from the third signaling message using the deterministic encryption algorithm to generate the second identifier associated with the communication session, and transmitting a fourth signaling message comprising the second identifier generated by the transformation of at least part of the first identifier from the third signaling message. The third signaling message may comprise a first quality reporting signaling message for the communication session and may be received via the first signaling segment, and the fourth signaling message may comprise a second quality reporting signaling message and be transmitted via the second signaling segment. Hence, embodiments provide efficient network address hiding after the communication session setup phase by using the same encryption transformation applied during the communication session setup phase, for example in relation to communication session quality reporting.

In embodiments, the first identifier is received at an intermediate network device, and the method comprises determining that the received first identifier does not comprise at least a portion identifying the intermediate network device, wherein the transforming of at least part of the first identifier is carried out in response to the determination. Hence, a decision to apply an encryption transformation of the identifier can be taken.

In embodiments, the method comprises receiving a third signaling message comprising the second identifier, transforming at least part of the second identifier from the third signaling message using an inverse of the deterministic encryption algorithm to generate the first identifier associated with the communication session, and transmitting a fourth signaling message comprising the first identifier generated from the transformation of at least part of the second identifier from the third signaling message. The third signaling message may comprise a first quality reporting signaling message for the communication session and be received via the second signaling segment, and the fourth signaling message may comprise a second quality reporting signaling message and be transmitted via the first signaling segment. Hence, embodiments provide efficient network address hiding after the communication session setup phase by using an inverse of the encryption transformation applied during the communication session setup phase, for example in relation to communication session quality reporting.

In embodiments, the second identifier is received at an intermediate network device, and the method comprises determining that the received second identifier comprises at least a portion identifying the intermediate network device, wherein the transforming of at least part of the second identifier is carried out in response to the determination. Hence, a decision to apply a decryption transformation of the identifier can be taken.

In embodiments, the first quality reporting signaling message is received during the communication session. In embodiments, the first quality reporting signaling message is received after termination of the communication session. Hence, embodiments provide processing of quality reports without the need to store network address translation lookup tables during the communication session or maintain such network address translation lookup tables after termination of the communication session.

In embodiments, the first signaling message comprises a first quality reporting signaling message for the communication session and the second signaling message comprises a second quality reporting signaling message for the communication session. Hence, the network address hiding can function in relation to communication session quality reporting functionality.

In embodiments, the method comprises detecting that the first signaling message is of a communication session quality reporting type, wherein the transformation is carried out in response to the detection. Hence, if monitoring of the type of signaling messages indicates a quality reporting type, a device can accurately detect that appropriate transformation of the identifier should be carried out such that downstream devices in the signaling path can recognize the correct communication session to which the quality reporting signaling messages relate.

In embodiments, the first identifier includes a portion comprising a network address for at least one device in the signaling path of the communication session. Hence, a network address of the at least one device can be hidden from other devices in the signaling path for the communication session.

In embodiments at least one device comprises an endpoint device, and the first signaling message is generated by the endpoint device, whereas in other embodiments, the at least one device comprises a softswitch, and the first signaling message is generated by the softswitch. Hence, access to an identifier for a device can be prevented. This may for example be useful in preventing an address for an endpoint device which is only valid in a private network from being made available externally to the network. This may also be useful in preventing hacking of an intermediate network device such as a softswitch acting as a quality reporting collector entity by one or more endpoint devices.

In embodiments, the communication session comprises a Session Initiation Protocol (SIP) communication session, the first and second signaling messages comprise first and second SIP signaling messages, and the first and second identifiers are session identifiers contained in respective session identifier fields of the first and second SIP signaling messages. Hence, in a SIP environment IP addresses of devices in the signaling path for a session can be hidden when referenced in session identifier fields used in a message sent along the a particular signaling segment.

In embodiments, the first and second signaling messages comprise one or more of SIP INVITE messages, SIP SUBSCRIBE messages, and SIP REFER messages. In other embodiments, the first and second signaling messages comprise one or more of SIP NOTIFY messages, and SIP PUBLISH messages. Hence, the described techniques can be employed in relation to a number of different types of SIP setup and reporting signaling messages.

In embodiments, the communication session comprises a Voice over Internet Protocol (VoIP) or Communications over Internet Protocol (CoIP) call.

In embodiments, the transformation of the first identifier is carried out by a session border controller located between the first and second signaling segments, the transformation is applied to the entire contents of the first identifier and the result of the transformation is added as a prefix to a network address of the session border controller to form the second identifier. Hence, a session border controller is able to make a decision as to whether an encryption or decryption transformation is applied to the identifier which allows association of the signaling message to the correct communication session by a downstream device in the signaling path for the session.

In accordance with embodiments, there is a method of processing communication sessions in a telecommunications network, each communication session having a signaling path spanning a plurality of devices including one or more intermediate network devices and at least two endpoint devices, the signaling path comprising a plurality of signaling segments, each segment being between two devices in the plurality of devices, the method comprising:
  receiving, via a first signaling segment for a communication session, a first communication session setup signaling message comprising a first identifier associated with the communication session;
  transforming at least part of the first identifier using a deterministic encryption algorithm to generate a second identifier;
  transmitting, via a second signaling segment for the communication session, a second communication session setup signaling message comprising the second identifier to associate the second identifier with the communication session;

receiving, via the second signaling segment, a first quality reporting signaling message for the communication session, the first quality reporting signaling message comprising the second identifier;

transforming at least part of the second identifier from the first quality reporting signaling message using an inverse of the deterministic encryption algorithm to generate the first identifier associated with the communication session; and transmitting, via the first signaling segment, a second quality reporting signaling message comprising the first identifier generated from the transforming.

In accordance with embodiments, there is a method of processing communication sessions in a telecommunications network, each communication session having a signaling path spanning a plurality of devices including one or more intermediate network devices and at least two endpoint devices, the signaling path comprising a plurality of signaling segments, each segment being between two devices in the plurality of devices, the method comprising:

receiving, via a first signaling segment for a communication session, a first communication session setup signaling message comprising a first identifier associated with the communication session;

transforming at least part of the first identifier using a deterministic encryption algorithm to generate a second identifier;

transmitting, via a second signaling segment for the communication session, a second communication session setup signaling message comprising the second identifier to associate the second identifier with the communication session;

receiving, via the first signaling segment, a first quality reporting signaling message for the communication session, the first quality reporting signaling message comprising the first identifier;

further transforming at least part of the first identifier from the first quality reporting signaling message using the deterministic encryption algorithm to generate the second identifier associated with the communication session; and transmitting, via the second signaling segment, a second quality reporting signaling message comprising the second identifier generated from the further transforming.

In accordance with embodiments, there is apparatus adapted to perform the methods of the various different embodiments described herein.

In accordance with embodiments, there is a session border controller for processing communication sessions in a telecommunications network, each communication session having a signaling path spanning a plurality of devices including one or more session border controllers, a softswitch and at least two endpoint devices, the signaling path comprising a first signaling segment located between one of the endpoint devices and the session border controller, and a second signaling segment located between the session border controller and the softswitch, the session border controller comprising:

a first interface configured to receive, via the first signaling segment for a communication session, a first signaling message comprising a first identifier associated with the communication session;

a processor configured to transform at least part of the first identifier using a deterministic encryption algorithm to generate a second identifier; and a second interface configured to transmit, via the second signaling segment for the communication session, a second signaling message comprising the second identifier to associate the second identifier with the communication session.

In accordance with embodiments, there is computer software adapted to perform the methods of the various different embodiments described herein.

In accordance with embodiments, there is a computer program product comprising a non-transitory computer-readable storage medium having computer readable instructions stored thereon, the computer readable instructions being executable by a computerized device to cause the computerized device to perform a method for processing communication sessions in a telecommunications network, each communication session having a signaling path spanning a plurality of devices including one or more intermediate network devices and at least two endpoint devices, the signaling path comprising a plurality of signaling segments, each segment being between two devices in the plurality of devices, the method comprising:

receiving, via a first signaling segment for a communication session, a first signaling message comprising a first identifier associated with the communication session;

transforming at least part of the first identifier using a deterministic encryption algorithm to generate a second identifier; and transmitting, via a second signaling segment for the communication session, a second signaling message comprising the second identifier to associate the second identifier with the communication session.

Further features and advantages of embodiments will become apparent from the following description of embodiments, given by way of example only, which is made with reference to the accompanying drawings.

DETAILED DESCRIPTION OF CERTAIN INVENTIVE EMBODIMENTS

Figure 1:
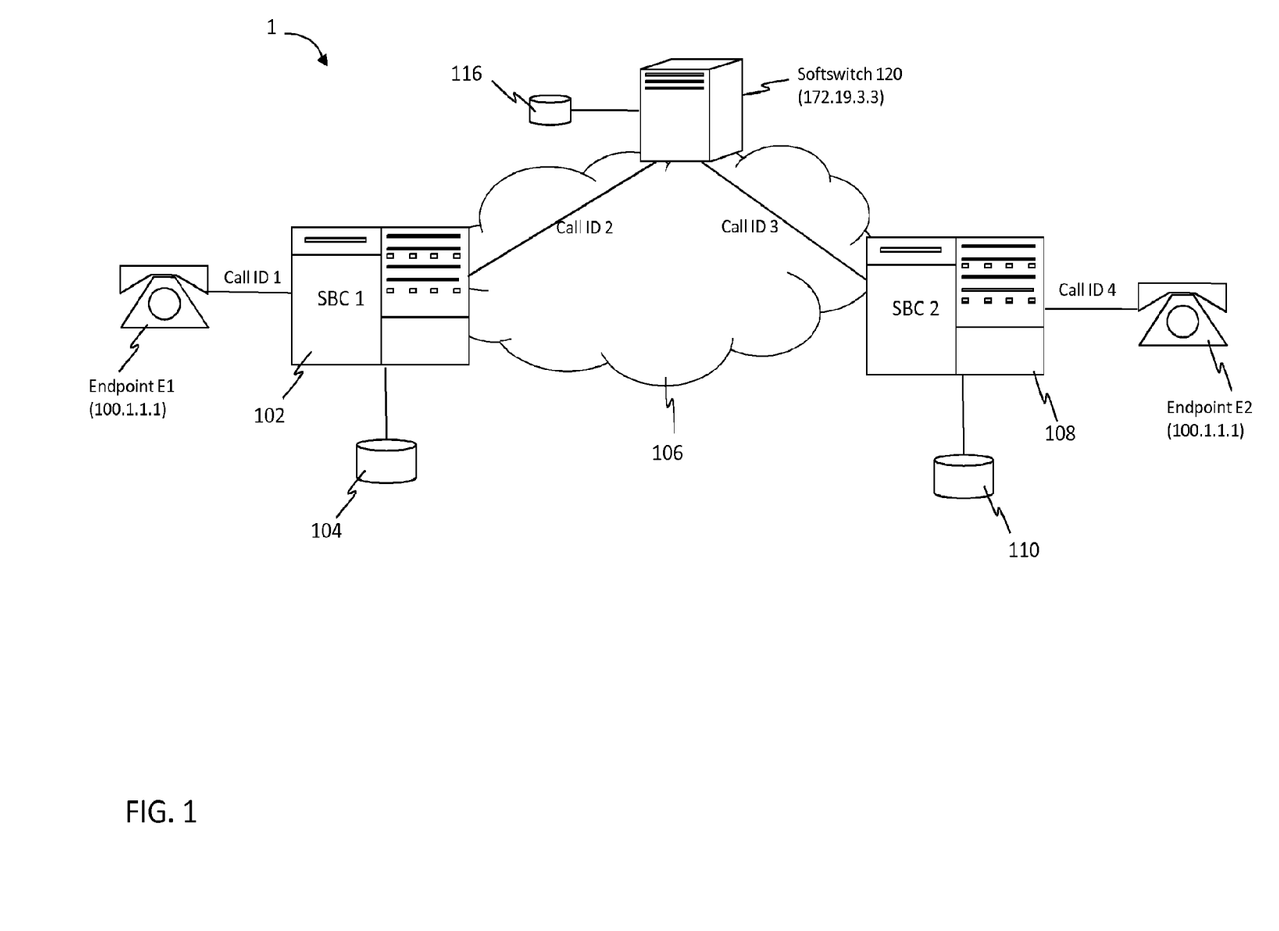
FIG. 1 is a system diagram according to one or more embodiments.

FIG. 1 is a system diagram according to embodiments. FIG. 1 illustrates an example telecommunications network 1 that includes endpoint devices E1 and E2 and a plurality of intermediate network devices. In this case, the plurality of intermediate network devices includes application gateway 102, application gateway 108 and softswitch 120. Telecommunications network 1 may contain more endpoint devices and more intermediate network devices (not shown).

Endpoint device E1 is connected to application gateway 102 (denoted as 'SBC 1' in FIG. 1) which is in turn connected to network 106. Endpoint device E1 may be located in a private Local Area Network (LAN) with SBC 1 located at the border between the LAN and network 106. Network 106 may comprise one or more packet-switched networks such as the Internet and/or circuit-switched networks such as a Public Switched Telephone Network (PSTN). Endpoint device E2 is connected to application gateway 108 (denoted as 'SBC 2' in FIG. 1) which is in turn connected to network 106. Endpoint device E2 may be located in a private LAN with SBC 2 located at the border between the LAN and network 106. Application gateways 102 and 108 have access to databases 104 and 110 respectively.

Softswitch 120 is responsible for routing communication sessions such as voice calls to and from a number of endpoint devices including E1 and E2. Softswitch 120 has access to database 116. A softswitch is an entity or cluster of entities, also known as a Media Gateway Controllers (MGCs) or call agent. A softswitch provides the intelligence that controls packet-based telephony services, including the ability to select processes that can be applied to a communication session, routing for a communication session within the network based on signaling and subscriber database information, the ability to transfer control of the communication session to another network element and management functions such as provisioning, fault detection and billing. A softswitch also provide the architecture for enabling conversion between signaling protocols such as the Signaling System #7 (SS7) and the Session Initiation Protocol (SIP). Softswitch 120 acts as a collector network entity in relation to communication session quality reporting functionality, such functionality being described in more detail below.

Endpoint devices E1 and E2 are capable of communicating with each other in communication sessions and could for example comprise VoIP telephones, or computing devices such as personal computers configured to conduct communications sessions. Each application gateway 102, 108 could for example take the form of a Session Border Controller (SBC), a computer server that includes hardware and/or software implementing a SIP proxy server, or other forms of application gateway.

An application gateway will typically (but not always) be located on the boundary between two different domains or parts of a telecommunications network, for example on the boundary between a private LAN and the Internet, with the application gateway being responsible for policing communication sessions in and out of the private LAN.

In the following example embodiments, the user of E1 initiates a communication session such as a voice call with the user of E2 such that a communication session between endpoint devices E1 and E2 is established, i.e. endpoint device E1 is an originating endpoint device and endpoint device E2 is a terminating endpoint device. The communications session will have a media path for transfer of media data between endpoint devices E1 and E2 and a signaling path for transfer of signaling information for setup and control of the communication session.

In embodiments, the signaling path for the communication session spans endpoint devices E1 and E2 and intermediate network devices SBC 1, SBC 2 and softswitch 120. The signaling path for the communication session comprises a plurality of signaling segments, with each signaling segment being between two devices. The signaling path between endpoint device E1 and SBC 1 forms a first signaling segment, the signaling path between SBC 1 and softswitch 120 forms a second signaling segment, the signaling path between softswitch 120 and SBC 2 forms a third signaling segment and the signaling path between SBC 2 and endpoint device E2 forms a fourth signaling segment.

Endpoint device E1 has a network address in the form of an IP address, in this case 100.1.1.1. Similarly, endpoint device E2 has an IP address of 100.1.1.2 and softswitch 120 has an IP address of 172.19.3.3. SBC 1 has a network address in the form of a domain address @sbc1_ss.com and SBC 2 has a network address in the form of a domain address @sbc2_pbx2.com.

Figure 2:
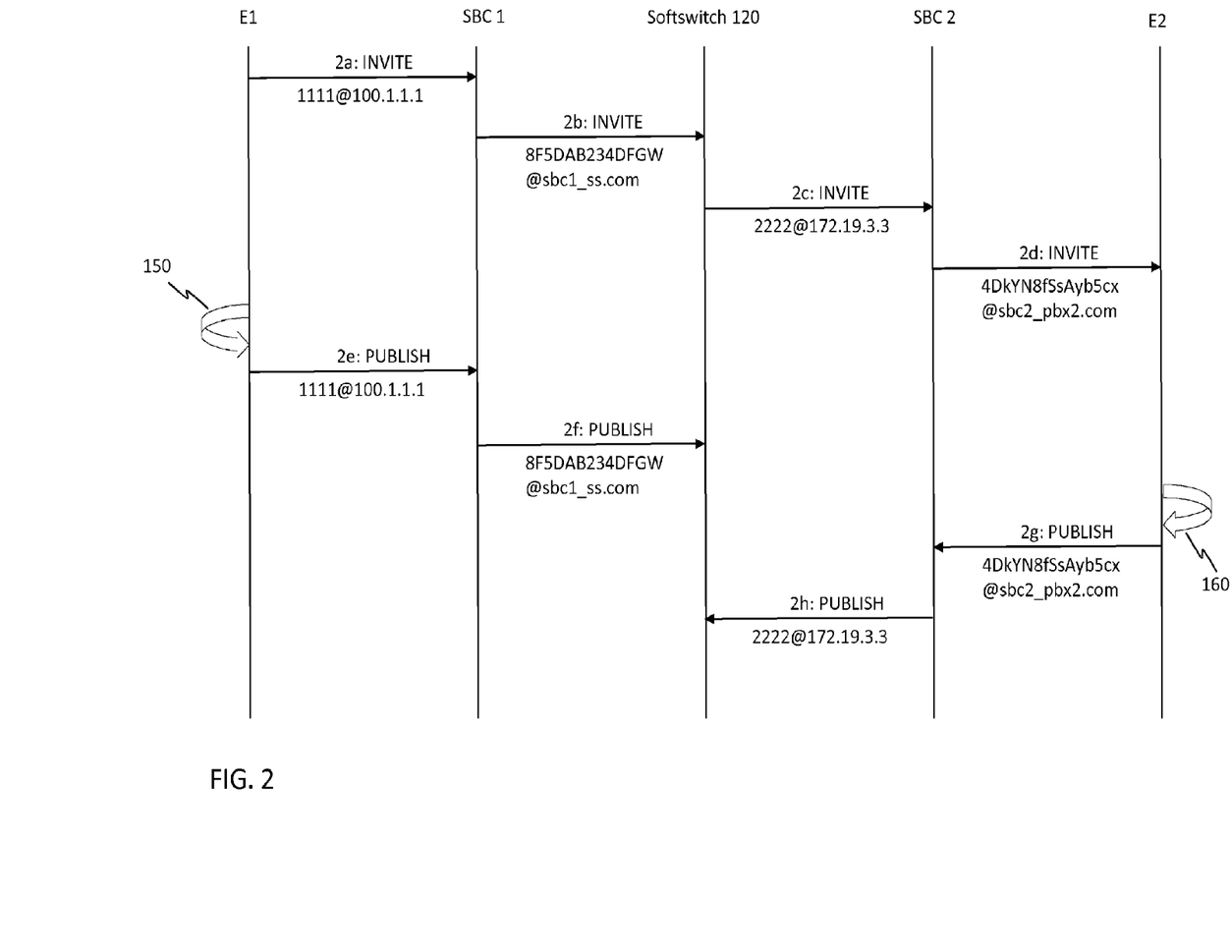
FIG. 2 is a signaling message flow diagram according to one or more embodiments.

FIG. 2 is a signaling message flow diagram according to embodiments. In these embodiments, processing of SIP signaling messages for a communication session conducted between endpoint devices E1 and E2 is described. FIG. 2 shows a number of SIP signaling messages being transmitted via different segments of a communication session; the type of SIP message and message sequence identifier (2a, 2b, 2c, etc.) is given above the arrow between the respective devices of a segment and a call identifier associated with the communication session is given below the arrow.

A session identifier (which is placed in a session identifier field denoted 'Call-ID' in a SIP header of a SIP message; and may be placed in other session identifier fields denoted in various other manners, such as "CallID"; SessionID; etc. within a SIP body of a SIP message) is a unique identifier for a communication session, typically generated by the combination of a random string and a hostname or IP address of the device generating the call identifier.

In embodiments, an application gateway device which is located in the signaling path for a communication session may modify an identifier contained in a signaling message transmitted along the signaling path for the communication session in order to hide a network address relating to one or more devices in the signaling path from other devices in the signaling path. Embodiments provide methods and apparatus by which a device in the signaling path of the communication session may correctly reference an identifier associated with a communication session, such as a call identifier, when is it referred to in a subsequent signaling message for the communication session. To this aim, embodiments employ a deterministic encryption algorithm to transform identifiers such as call identifiers contained in signaling messages. Identifiers in subsequent signaling messages can be similarly transformed allowing referencing to the correct communication session by other devices.

Use of a transformation algorithm with encryption capabilities ensures hiding of network addresses to downstream devices in the signaling path. Use of a transformation algorithm with deterministic qualities ensures that the process is repeatable for subsequent signaling messages such that downstream devices in the signaling path can associate the identifiers in subsequently transformed signaling messages with the correct communication session. Use of a reversible encryption algorithm, instead of for example a one-way hash algorithm, ensures that the reverse transformation can also be achieved in subsequent signaling messages flowing in the opposite direction. Embodiments achieve efficient network address hiding without the need for application gateway devices to store and maintain network address translation lookup tables for communication sessions.

The user of originating endpoint device E1 wishes to conduct a communication session with the user of terminating endpoint device E2. Initiation of the communication session begins with appropriate user input on E1, for example selection of the user of E2 from an address book stored on E1. E1 is configured to contact application gateway SBC 1 with all communication session requests, i.e. SBC1 acts as a SIP back-to-back user agent for E1. E1 therefore transmits a communication session setup signaling message in the form of a SIP Invite signaling message to SBC 1 via the signaling segment between E1 and SBC 1 in step 2a. The SIP Invite message of step 2a contains a first identifier associated with the communication session. In this example, the first identifier is a session identifier (denoted 'Call ID 1' in FIG. 1), 1111@100.1.1.1, such being included in a Call-ID field in the SIP header of the SIP Invite message of step 2a. The session identifier here consists of a random string (1111) and an IP address (100.1.1.1) for endpoint device E1.

When SBC 1 receives the communication session setup signaling message of step 2a it transforms at least a part of the first identifier contained in the communication session setup signaling message of step 2a using a deterministic encryption algorithm to generate a second identifier. In order to apply the deterministic encryption algorithm, SBC 1 consults database 104 to retrieve an encryption key 304 for the deterministic encryption algorithm stored therein.

SBC 1 transmits a communication session setup signaling message comprising the second identifier in the form of a SIP Invite signaling message to softswitch 120 via the signaling segment between SBC 1 and softswitch 120 to associate the second identifier with the communication session in step 2b. In this example, SBC 1 creates a call identifier (denoted 'Call ID 2' in FIG. 1) by adding the result of the transformation (8F5DAB234DFGW) as a prefix to a network address (@sbc1_ss.com) of SBC 1 to form the second identifier, 8F5DAB234DFGW@sbc1_ss.com, which is included in the Call-ID field of the SIP header of the SIP Invite message of step 2b.

Note that the first identifier will in general contain an '@' symbol for linking the random string to an address, whereas the second identifier generated from the transformation will typically not contain an '@' symbol.

The session identifier in the signaling message of step 2a generated by E1 and received by SBC 1 includes a portion ('100.1.1.1') comprising a network address for endpoint device E1 which is located in the signaling path of the communication session. The session identifier in the signaling message of step 2b transmitted by intermediate network device SBC 1 does not include a portion comprising a network address for endpoint device E1, so network address hiding with respect to E1 may be thus achieved. The network address of E1 is thus hidden from softswitch 120.

When softswitch 120 receives the SIP Invite message of step 2b it stores the session identifier for the segment of the communication session between SBC 1 and softswitch 120 in database 116.

Softswitch 120 transmits a communication session setup signaling message in the form of a SIP Invite signaling message to SBC 2 via the signaling segment between softswitch 120 and SBC 2 in step 2c. The SIP Invite message of step 2c contains a third identifier associated with the communication session. In this example, the third identifier is a call identifier (denoted 'Call ID 3' in FIG. 1), 2222@172.19.3.3, which is included in the Call-ID field of the SIP header of the SIP Invite message of step 2c. The session identifier here consists of a random string (2222) and an IP address (172.19.3.3) for softswitch 120.

Softswitch 120 stores the session identifier for the segment of the communication session between softswitch 120 and SBC 2 in database 116.

When SBC 2 receives the communication session setup signaling message of step 2c it transforms at least a part of the third identifier contained in the communication session setup signaling message of step 2c using a deterministic encryption algorithm to generate a fourth identifier. In order to apply the deterministic encryption algorithm, SBC 2 consults database 110 to retrieve an encryption key for the deterministic encryption algorithm stored therein.

SBC 2 transmits a communication session setup signaling message comprising the fourth identifier in the form of a SIP Invite signaling message to E2 via the signaling segment between SBC 2 and E2 to associate the fourth identifier with the communication session in step 2d. In this example, SBC 2 creates a call identifier (denoted 'Call ID 4' in FIG. 1) by adding the result of the transformation (4DkYN8fSsAyb5cx) as a prefix to a network address (@sbc2_pbx2.com) of SBC 2 to form the fourth identifier, 4DkYN8fSsAyb5cx@sbc2_pbx2.com, which is included in the Call-ID field of the SIP header of the SIP Invite message of step 2d.

The session identifier in the signaling message of step 2c generated by intermediate network device softswitch 120 and received by SBC 2 includes a portion ('172.19.3.3') comprising a network address for softswitch 120 which is located in the signaling path of the communication session. The session identifier in the signaling message of step 2d transmitted by SBC 2 does not include a portion comprising a network address for softswitch 120, so network address hiding with respect to softswitch 120 may thus be achieved. The network address of softswitch 120 is thus hidden from endpoint device E2.

During setup of a communication session between endpoint device E1 and endpoint device E2, a SIP 200 OK message will be transmitted in response to the Invite message transmitted for each segment. A SIP ACK message will then be transmitted to acknowledge receipt of each SIP 200 OK message. Such SIP 200 OK and SIP ACK messages are not depicted in FIG. 2 for clarity purposes and are not described herein in any further detail as their use in relation to the embodiments described here will be clear to one skilled in the art.

After steps 2a to 2d have been carried out, the communication session has been established and the users of E1 and E2 may communicate with each other. Media data for the communication session such as voice and/or video data is able to flow (not shown) between E1 and E2, possibly via one or more of SBC 1, SBC 2 and softswitch 120.

During, the communication session, endpoint device E1 may generate one or more statistics for the quality of communication in the communication session, for example relating to packet loss, jitter, round-trip delay time, etc. Such statistics can be reported to a collector network entity such as softswitch 120 to enable communication session quality reporting functionality.

With reference to FIG. 2, endpoint device E1 generates a communication session quality report, see item 150, in relation to the communication session established in steps 2a to 2d and transmits a first quality reporting signaling message containing the generated quality report for the communication session to SBC 1 in step 2e. In this case, the first quality reporting signaling message is in the form of a SIP PUBLISH signaling message transmitted to SBC 1 via the signaling segment between E1 and SBC1. The SIP PUBLISH message of step 2e contains the first identifier associated with the communication session, in this case 1111@100.1.1.1, which is included in a session identifier field (denoted, for example, in this embodiment as CallID) in a voice quality session report (VQSessionReport) in the SIP body of the SIP PUBLISH message of step 2e.

When SBC 1 receives the first quality reporting signaling message of step 2e it transforms at least a part of the first identifier contained in the communication session signaling message of step 2e using the deterministic encryption algorithm to generate the second identifier. In order to apply the deterministic encryption algorithm, SBC 1 consults database 104 to retrieve the encryption key for the deterministic encryption algorithm stored therein.

SBC 1 transmits a second quality reporting signaling message comprising the second identifier generated by the transformation of the first identifier contained in the communication session setup signaling message of step 2e in the form of a SIP PUBLISH signaling message to softswitch 120 via the signaling segment between SBC 1 and softswitch 120 in step 2f. In this example, SBC 1 creates a session identifier by adding the result of the transformation (8F5DAB234DFGW) as a prefix to a network address (@sbc1_ss.com) of SBC 1 to form the second identifier, 8F5DAB234DFGW@sbc1_ss.com, the whole of which, or at least the first string of which (preceding the '@' symbol) is included in the CallID field in a voice quality session report (VQSessionReport) in the SIP body of the SIP PUBLISH message of step 2f.

The session identifier in the signaling message of step 2e generated by endpoint device E1 and received by intermediate network device SBC 1 includes a portion ('100.1.1.1') comprising a network address for endpoint device E1 which is located in the signaling path of the communication session. The session identifier in the signaling message of step 2f transmitted by SBC 1 does not include a portion comprising a network address for endpoint device E1, so network address hiding with respect to E1 may thus be achieved. The network address of E1 is thus hidden from softswitch 120.

When softswitch 120 receives the SIP PUBLISH message of step 2f it examines the CallID field to find a session identifier of 8F5DAB234DFGW@sbc1_ss.com. Softswitch 120 consults database 116 and recognizes that this session identifier relates to the communication session between endpoint device E1 and endpoint device E2, in particular the session identifier identified in the Call-ID field used in previous signaling for the segment between softswitch 120 and SBC 1. Softswitch 120 is thus able to react to the communication session quality report accordingly in relation to the correct communication session.

During, the communication session, endpoint device E2 may also generate one or more statistics for the quality of communication in the communication session. Such statistics can be reported to a collector network entity such as softswitch 120 to enable communication session quality reporting functionality.

With reference to FIG. 2, endpoint device E2 generates a communication session quality report, see item 160, in relation to the communication session established in steps 2a to 2d and transmits a third quality reporting signaling message containing the quality report generated for the communication session to SBC 2 in step 2g. In this case, the first quality reporting signaling message is in the form of a SIP PUBLISH signaling message transmitted to SBC 2 via the signaling segment between E2 and SBC 2. The SIP PUBLISH message of step 2g contains the fourth identifier associated with the communication session, in this case 4DkYN8fSsAyb5cx@sbc2_pbx2.com, the whole of which, or at least the first string of which (preceding the '@' symbol) is included in the CallID field in a voice quality session report (VQSessionReport) in the SIP body the SIP PUBLISH message of step 2g.

Here, the CallID includes a portion (sbc2_pbx2.com) comprising a network address for intermediate network device SBC 2 which is located in the signaling path of the communication session.

When SBC 2 receives the third quality reporting signaling message of step 2g it transforms at least a part of the fourth identifier contained in the communication session setup signaling message of step 2g using an inverse of the deterministic encryption algorithm to generate the third identifier associated with the communication session. In order to apply the inverse of the deterministic encryption algorithm, SBC 2 consults database 110 to retrieve a decryption key 306 for the inverse of the deterministic encryption algorithm stored therein.

In such embodiments, the deterministic encryption algorithm comprises a reversible deterministic encryption algorithm such that an inverse of the deterministic encryption algorithm exists. The inverse of the deterministic encryption algorithm can then be applied to implement decryption of an identifier in a signaling message transmitted in the opposite direction along the signaling path to which the deterministic encryption algorithm was previously applied.

SBC 2 transmits a fourth quality reporting signaling message comprising the third identifier generated by the transformation of the fourth identifier contained in the communication session setup signaling message of step 2g in the form of a SIP PUBLISH signaling message to softswitch 120 via the signaling segment between SBC 2 and softswitch 120 in step 2h. In this example, SBC 2 creates a session identifier for a CallID field of a voice quality session report (VQSessionReport) in the SIP body of the SIP PUBLISH message of step 2h using the result of the transformation of the fourth identifier, i.e. decryption of the fourth identifier results in the session identifier of 2222@172.19.3.3 (which comprises a random string (2222) and an IP address (172.19.3.3) for softswitch 120).

When softswitch 120 receives the SIP PUBLISH message of step 2h it examines the CallID field in the voice quality session report (VQSessionReport) in the SIP body of the SIP PUBLISH message to find a session identifier of 2222@172.19.3.3. Softswitch 120 consults database 116 and recognizes that this session identifier relates to the communication session between endpoint device E1 and endpoint device E2, in particular the session identifier identified in the Call-ID field used in previous signaling for the segment between softswitch 120 and SBC 2. Softswitch 120 is thus able to react to the communication session quality report accordingly in relation to the correct communication session.

An example of a communication session quality reporting signaling message is given as follows:
PUBLISH sip:collector@example.org SIP/2.0
Via: SIP/2.0/UDP pc22.example.org; branch=z9hG4bK3343d7
Max-Forwards: 70
To: <sip:proxy@example.org>
From: Alice <sip:alice@example.org>;tag=a3343df32
Call-ID: 1890463548
CSeq: 4331 PUBLISH
Allow: INVITE, ACK, CANCEL, OPTIONS, BYE, REFER, SUBSCRIBE, NOTIFY
Event: vq-rtcpxr
Accept: application/sdp, message/sipfrag
Content-Type: application/vq-rtcpxr
Content-Length: . . .
VQSessionReport: CallTerm
CallID: 6dg37f1890463
LocalID: Alice <sip:alice@example.org>
RemoteID: Bill <sip:bill@example.net>
OrigID: Alice <sip:alice@example.org>
LocalGroup: example-phone-55671
RemoteGroup: example-gateway-09871

LocalAddr: IP=10.10.1.100 PORT=5000
   SSRC=1a3b5c7d
LocalMAC: 00:1f:5b:cc:21:0f
RemoteAddr:IP=11.1.1.150 PORT=5002
   SSRC=0x2468abcd
RemoteMAC: 00:26:08:8e:95:02
LocalMetrics:
Timestamps:START=2004-10-10T18:23:43Z
   STOP=2004-10-01T18:26:02Z
SessionDesc:PT=18 PD=G729 SR=8000 FD=20 FO=20 FPP=2 PPS=50 FMTP="annexb=no" PLC=3 SSUP=on
JitterBuffer:JBA=3 JBR=2 JBN=40 JBM=80 JBX=120
PacketLoss:NLR=5.0 JDR=2.0
BurstGapLoss:BLD=0 BD=0 GLD=2.0 GD=500 GMIN=16
Delay:RTD=200 ESD=140 SOWD=200 IAJ=2 MAJ=10
Signal:SL=−21 NL=−50 RERL=55
QualityEst:RLQ=90 RCQ=85 EXTRI=90 MOSLQ=4.2 MOSCQ=4.3 QoEEstAlg=P.564
RemoteMetrics:
Timestamps:START=2004-10-10T18:23:43Z
   STOP=2004-10-01T18:26:02Z
SessionDesc:PT=18 PD=G729 SR=8000 FD=20 FO=20 FPP=2 PPS=50 FMTP="annexb=no" PLC=3 SSUP=on
JitterBuffer:JBA=3 JBR=2 JBN=40 JBM=80 JBX=120
PacketLoss:NLR=5.0 JDR=2.0
BurstGapLoss:BLD=0 BD=0 GLD=2.0 GD=500 GMIN=16
Delay:RTD=200 ESD=140 SOWD=200 IAJ=2 MAJ=10
Signal:SL=−21 NL=−45 RERL=55
QualityEst:RLQ=90 RCQ=85 MOSLQ=4.3 MOSCQ=4.2 QoEEstAlg=P.564
DialogID:1890463548@alice.example.org;to-tag=8472761; from-tag=9123dh311

In the above example, the quality reporting signaling message is a Voice Quality Metric (VQM) report. The CallID field which is encrypted as it passes through an application gateway according to embodiments is shown in bold.

In alternative embodiments, one or more of endpoint devices E1 and E2 generates statistics for the quality of communication in the communication session and reports such statistics to softswitch 120 after termination of the communication session. In the example of a SIP communication session, this could be after transmittal of one or more SIP BYE signaling messages by one or more devices in the signaling path for the communication session. SBC 1 and/or SBC 2 are able to handle processing of call identifiers for such 'final', i.e. post session termination, reports even after termination of the session in a similar manner to reports received whilst the communication session is still taking place. Embodiments thus do not require any network address translation lookup tables to be stored by SBC 1 or SBC 2 during the communication session or maintained after termination of the communication session; SBC 1 and SBC 2 store and refer to an encryption key 304 and a deterministic encryption algorithm. SBC 2 stores and refers to a decryption key 306 and an inverse of the deterministic encryption algorithm. The encryption key 304 and the decryption key may be the same key, or may be different, related keys. The encryption key 304 and/or decryption key 306 can be retrieved from the appropriate database 104 or 110.

When an intermediate network device such as SBC 1 or SBC 2 receives a signaling message, a decision needs to be taken as to whether to carry out decryption or decryption of an identifier for the communication session such as a call identifier contained within the signaling message. To make this decision, the intermediate network device examines appropriate identifiers within the signaling message looking for at least a portion which identifies the intermediate network device.

If the intermediate network device determines that the received identifier does not comprise at least a portion identifying the intermediate network device, then the intermediate network device knows that the received identifier should be transformed using a deterministic encryption algorithm, i.e. encryption is carried out. This situation applies to the decision taken by SBC 1 between steps 2a and 2b and also between steps 2e and 2f described above. This situation also applies to the decision taken by SBC 2 between steps 2c and 2d described above.

Conversely, if the intermediate network device determines that the received identifier does comprise at least a portion identifying the intermediate network device, then the intermediate network device knows that the received identifier should be transformed using an inverse of the deterministic encryption algorithm, i.e. decryption is carried out. This situation applies to the decision taken by SBC 2 between steps 2g and 2h described above.

In embodiments, the type of incoming signaling messages is monitored in order to identify which messages an encryption or decryption transformation should be applied to. If the monitoring detects that a signaling message is of a communication session setup type, then an encryption or decryption transformation should be applied to the appropriate identifier contained within the SIP header of the message, for example the Call-ID. Similarly, if the monitoring detects that a signaling message is of a communication session quality reporting type, then an encryption or decryption transformation should be applied to the appropriate identifier contained within a quality report in the SIP body of the message, for example the session identifier in the CallID field. If the monitoring detects other types of signaling messages, then no transformation of identifiers may be carried out.

In embodiments, the transformation of an identifier in a received signaling message is carried out by a session border controller located between signaling segments on the incoming and outgoing directions of the signaling path. The transformation is applied to the entire contents of the received identifier and the result of the transformation is added as a prefix to a network address of the session border controller to form the identifier in the transmitted signaling message.

Figure 3:
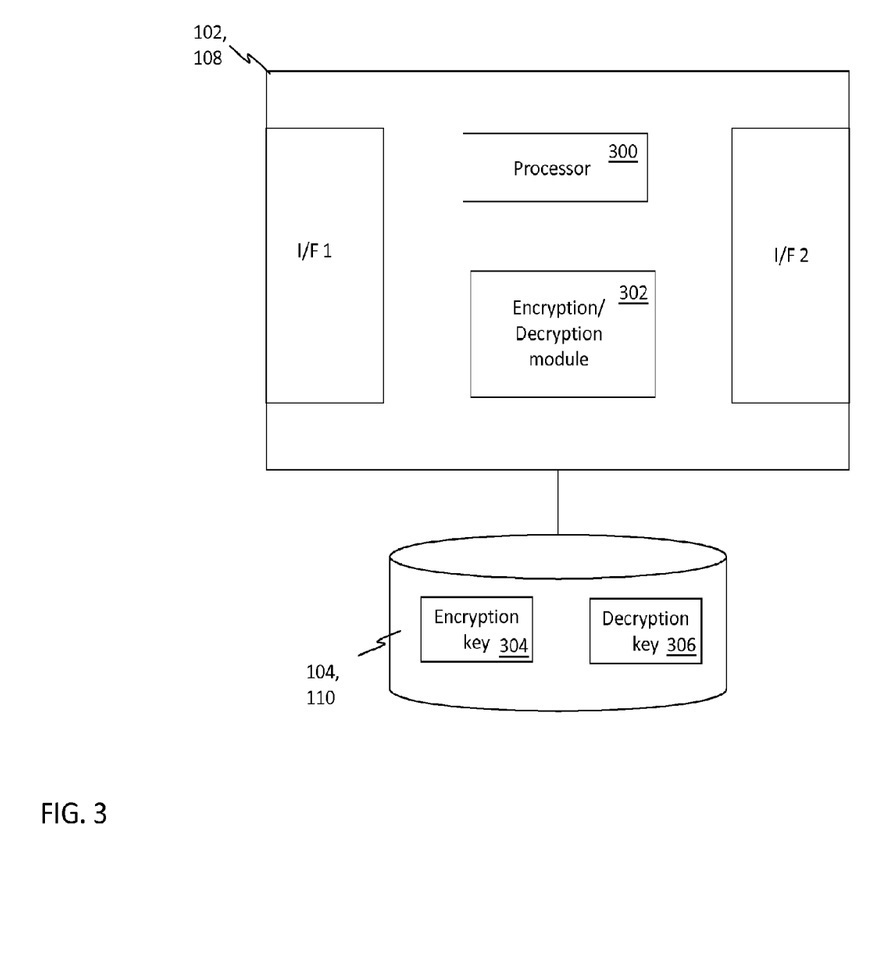
FIG. 3 is a block diagram showing components of an application gateway according to one or more embodiments.

FIG. 3 is a block diagram showing components of an application gateway according to embodiments. In these example embodiments, the application gateway comprises a session border controller, for example SBC 1 or SBC 2 described above, for processing communication sessions in a telecommunications network. Each communication session has a signaling path spanning a plurality of devices including one or more session border controllers, a softswitch and at least two endpoint devices. The signaling path comprises a first signaling segment located between one of the endpoint devices and the session border controller, and a second signaling segment located between the session border controller and the softswitch.

The session border controller 102, 108 comprises a first interface, I/F 1, configured to receive, via the first signaling segment for a communication session, a first signaling message comprising a first identifier associated with the communication session. The session border controller 102, 108 comprises a processor 300 configured to transform at least part of the first identifier using a deterministic encryption algorithm to generate a second identifier. Further, the session border controller 102, 108 comprises a second interface, I/F 2 configured to transmit, via the second signaling segment for the communication session, a second signaling message comprising the second identifier to associate the second identifier with the communication session.

The session border controller 102, 108 has access to a database 104, 110, either located integrally or remotely from session border controller 102, 108. The transformation is carried out by processor 300 with reference to an encryption/decryption module 302 which performs either an encryption of the input identifier by retrieving an encryption key 304 from database 104, 110 or a decryption of the input identifier by retrieving a decryption key 306 from database 104, 110. In practice, session border controller 102, 108 will process signaling messages for a plurality of other endpoint or intermediate network devices (not shown) via a plurality of ports and/or trunk connections.

In embodiment described above, the deterministic encryption algorithm could for example comprise AES™ (Advanced Encryption Standard) or RC4™ (Rivest Cipher 4).

The deterministic encryption algorithm has been described in the above embodiments as being reversible. In other embodiments, a non-reversible deterministic encryption algorithm could be employed, for example in SBC 1 where decryption is not required (whereas decryption is required in SBC 2).

In the above embodiments, the output of the deterministic encryption algorithm does not change for the same input. However, in alternative embodiments, the output of the encryption algorithm may alternatively change in a deterministic manner, for example according to the time at which the algorithm is applied. The time could be based on the time given in an accompanying timestamp. In such embodiments which use a technique alternative to those described previously, the first identifier is encrypted using a given encryption algorithm, for example by SBC 1. A downstream device in the signaling path for the communication session, for example softswitch 120, which receives the second signaling message needs to be able to process the second identifier correctly. This can be achieved by implementing sharing of the given encryption algorithm, i.e. both SBC 1 and softswitch 120 have knowledge of how the given encryption algorithm operates, for example including how its output varies with time.

As an example, the shared algorithm could involve SBC 1 using a first encryption algorithm during evenly numbered hours of the day and using a second, different encryption algorithm using oddly numbered hours of the day. If softswitch 120 has knowledge of the odd/even hour schedule by which SBC 1 decides which of the first and second encryption algorithms to use, then softswitch 120 will be able to process the two different identifiers received in signaling messages during such periods correctly and identify them as relating to the same session. Other forms of shared encryption algorithm could also be employed, similarly for the case of decryption.

The above embodiments are to be understood as illustrative examples. Further embodiments are envisaged.

In the embodiments described above, the session identifier is initially generated by the combination of a random string and an IP address for the originating endpoint device. In alternative embodiments, the session identifier may be generated by the combination of a random string and a hostname for the originating endpoint device.

In embodiments described above, the signaling messages received by SBC 1 or SBC 2 are received via segments of the communication session from devices in the signaling path for the communication session. In alternative embodiments, one or more signaling messages could be received from devices not in the signaling path for the session. This could for example be the case in a law enforcement scenario in relation to legal media tapping of a communication session. In such a scenario, network 'sniffing' of signaling messages to/from an endpoint device or application gateway could be carried out by a law enforcement agency to ascertain a session identifier associated with a communication session. The session identifier could then be used in signaling messages sent to the application gateway, which would carry out the appropriate encryption/decryption of the session identifier, thus allowing the law enforcement agency to 'listen-in' on traffic for the communication session.

The embodiments depicted in FIG. 2 involve endpoint devices E1 and E2 reporting communication session quality using SIP PUBLISH signaling messages. In other embodiments, one or more SIP NOTIFY signaling messages could be employed, or a combination thereof.

The embodiments depicted in FIG. 2 involve endpoint devices E1 and E2 carrying out communication session setup processes using SIP INVITE messages. In other embodiments, one or more SIP SUBSCRIBE or SIP REFER signaling messages could be employed, or a combination thereof.

Some embodiments described above involve encryption/decryption of identifiers in relation to communication session quality reporting signaling. The techniques described herein can be applied to other processes where call references exist such as the replaces or target-dialog packages used in SIP call transfer operations.

Examples embodiments described above apply the techniques described herein in a SIP environment. The techniques described herein can also be applied in relation to other IP telephony or IP communication environments, for example in relation to International Telecommunication Union Telecommunication Standardization Sector (ITU-T) recommendation H.323, or the Media Gateway Control Protocol (MGCP), etc.

The techniques described herein can be applied in relation to Voice over Internet Protocol (VoIP) communication sessions involving transfer of voice or other audio data between endpoint devices. The techniques described herein can also be applied in relation to Communications over Internet Protocol (CoIP) communication sessions, for example involving transfer of multimedia data including text, image, video and other forms of digital data in addition to or alternatively to voice or audio data.

Embodiments comprise measures, including methods, apparatus and computer program products, for processing communication sessions in a telecommunications network, each communication session having a signaling path spanning a plurality of devices including one or more intermediate network devices and at least two endpoint devices, the signaling path comprising a plurality of signaling segments, each segment being between two devices in the plurality of devices, the method comprising:

receiving, via a first signaling segment for a communication session, a first communication session setup signaling message comprising a first identifier associated with the communication session;

transforming at least part of the first identifier using a deterministic encryption algorithm to generate a second identifier;

transmitting, via a second signaling segment for the communication session, a second communication session setup signaling message comprising the second identifier to associate the second identifier with the communication session;

receiving, via the second signaling segment, a first quality reporting signaling message for the communication session, the first quality reporting signaling message comprising the second identifier;

transforming at least part of the second identifier from the first quality reporting signaling message using an inverse of the deterministic encryption algorithm to generate the first identifier associated with the communication session; and transmitting, via the first signaling segment, a second quality reporting signaling message comprising the first identifier generated from the transforming.

Embodiments comprise measures, including methods, apparatus and computer program products, for processing communication sessions in a telecommunications network, each communication session having a signaling path spanning a plurality of devices including one or more intermediate network devices and at least two endpoint devices, the signaling path comprising a plurality of signaling segments, each segment being between two devices in the plurality of devices, the method comprising:

receiving, via a first signaling segment for a communication session, a first communication session setup signaling message comprising a first identifier associated with the communication session;

transforming at least part of the first identifier using a deterministic encryption algorithm to generate a second identifier;

transmitting, via a second signaling segment for the communication session, a second communication session setup signaling message comprising the second identifier to associate the second identifier with the communication session;

receiving, via the first signaling segment, a first quality reporting signaling message for the communication session, the first quality reporting signaling message comprising the first identifier;

further transforming at least part of the first identifier from the first quality reporting signaling message using the deterministic encryption algorithm to generate the second identifier associated with the communication session; and transmitting, via the second signaling segment, a second quality reporting signaling message comprising the second identifier generated from the further transforming.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of processing communication sessions in a telecommunications network, each communication session having a signaling path spanning a plurality of devices including one or more intermediate network devices and at least two endpoint devices, the signaling path comprising a plurality of signaling segments, each segment being between two devices in the plurality of devices, the method comprising:

receiving, via a first signaling segment for a communication session, a first signaling message comprising a first identifier associated with the communication session;

transforming at least part of the first identifier using a deterministic encryption algorithm to generate a second identifier; and transmitting, via a second signaling segment for the communication session, a second signaling message comprising the second identifier to associate the second identifier with the communication session.

2. The method of claim 1, wherein the first signaling message comprises a first communication session setup signaling message for the communication session and the second signaling message comprises a second communication session setup signaling message for the communication session.

3. The method of claim 1, further comprising:

receiving a third signaling message comprising the first identifier;

transforming at least part of the first identifier from the third signaling message using the deterministic encryption algorithm to generate the second identifier associated with the communication session; and transmitting a fourth signaling message comprising the second identifier generated by the transformation of at least part of the first identifier from the third signaling message.

4. The method of claim 3, wherein the third signaling message comprises a first quality reporting signaling message for the communication session and is received via the first signaling segment, and the fourth signaling message comprises a second quality reporting signaling message and is transmitted via the second signaling segment.

5. The method of claim 4, wherein the first quality reporting signaling message is received during the communication session.

6. The method of claim 4, wherein the first quality reporting signaling message is received after termination of the communication session.

7. The method of claim 1, wherein the first identifier is received at an intermediate network device, the method further comprising:

determining that the received first identifier does not comprise at least a portion identifying the intermediate network device, wherein the transforming of at least part of the first identifier is carried out in response to the determination.

8. The method of claim 1, further comprising:

receiving a third signaling message comprising the second identifier;

transforming at least part of the second identifier from the third signaling message using an inverse of the deterministic encryption algorithm to generate the first identifier associated with the communication session; and transmitting a fourth signaling message comprising the first identifier generated from the transformation of at least part of the second identifier from the third signaling message.

9. The method of claim 8, wherein the third signaling message comprises a first quality reporting signaling message for the communication session and is received via the second signaling segment, and the fourth signaling message comprises a second quality reporting signaling message and is transmitted via the first signaling segment.

10. The method of claim 8, wherein the second identifier is received at an intermediate network device, the method further comprising:
determining that the received second identifier comprises at least a portion identifying the intermediate network device,
wherein the transforming of at least part of the second identifier is carried out in response to the determination.

11. The method of claim 1, wherein the first signaling message comprises a first quality reporting signaling message for the communication session and the second signaling message comprises a second quality reporting signaling message for the communication session.

12. The method of claim 1, further comprising detecting that the first signaling message is of a communication session quality reporting type, wherein the transformation is carried out in response to the detection.

13. The method of claim 1, wherein the first identifier includes a portion comprising a network address for at least one device in the signaling path of the communication session.

14. The method of claim 13, wherein the at least one device comprises an endpoint device, and the first signaling message is generated by the endpoint device.

15. The method of claim 13, wherein the at least one device comprises a softswitch, and the first signaling message is generated by the softswitch.

16. The method of claim 1, wherein the communication session comprises a Session Initiation Protocol (SIP) communication session, the first and second signaling messages comprise first and second SIP signaling messages, and the first and second identifiers are session identifiers contained in respective session identifier fields of the first and second SIP signaling messages.

17. The method of claim 16, wherein the first and second signaling messages comprise one or more of:
SIP INVITE messages,
SIP SUBSCRIBE messages,
SIP REFER messages,
SIP NOTIFY messages, and
SIP PUBLISH messages.

18. The method of claim 1, wherein the transformation of the first identifier is carried out by a session border controller located between the first and second signaling segments, the transformation is applied to the entire contents of the first identifier and the result of the transformation is added as a prefix to a network address of the session border controller to form the second identifier.

19. The method of claim 1, wherein the deterministic encryption algorithm comprises one of Advanced Encryption Standard™ and Rivest Cipher 4™.

20. A session border controller for processing communication sessions in a telecommunications network, each communication session having a signaling path spanning a plurality of devices including one or more session border controllers, a softswitch and at least two endpoint devices, the signaling path comprising a first signaling segment located between one of the endpoint devices and the session border controller, and a second signaling segment located between the session border controller and the softswitch, the session border controller comprising:
a first interface configured to receive, via the first signaling segment for a communication session, a first signaling message comprising a first identifier associated with the communication session;
a processor configured to transform at least part of the first identifier using a deterministic encryption algorithm to generate a second identifier; and
a second interface configured to transmit, via the second signaling segment for the communication session, a second signaling message comprising the second identifier to associate the second identifier with the communication session.

21. A computer program product comprising a non-transitory computer-readable storage medium having computer readable instructions stored thereon, the computer readable instructions being executable by a computerized device to cause the computerized device to perform a method for processing communication sessions in a telecommunications network, each communication session having a signaling path spanning a plurality of devices including one or more intermediate network devices and at least two endpoint devices, the signaling path comprising a plurality of signaling segments, each segment being between two devices in the plurality of devices, the method comprising:
receiving, via a first signaling segment for a communication session, a first signaling message comprising a first identifier associated with the communication session;
transforming at least part of the first identifier using a deterministic encryption algorithm to generate a second identifier; and
transmitting, via a second signaling segment for the communication session, a second signaling message comprising the second identifier to associate the second identifier with the communication session.

* * * * *